United States Patent [19]

Hoshino et al.

[11] Patent Number: 5,473,147

[45] Date of Patent: * Dec. 5, 1995

[54] METHOD AND AN APPARATUS FOR CHECKING OBJECTS TO BE CHECKED FOR AUTHENTICITY

[75] Inventors: Hidekazu Hoshino; Masumi Yoda; Itsuo Takeuchi; Tatsuya Kurihara, all of Yokohama, Japan

[73] Assignee: NHK Spring Co., Ltd., Yokohama, Japan

[ * ] Notice: The portion of the term of this patent subsequent to Sep. 19, 2012, has been disclaimed.

[21] Appl. No.: 138,748

[22] Filed: Oct. 19, 1993

Related U.S. Application Data

[63] Continuation-in-part of Ser. No. 96,692, Jul. 23, 1993, abandoned.

[30] Foreign Application Priority Data

Sep. 25, 1992 [JP] Japan .................................. 4-256888
Dec. 28, 1992 [JP] Japan .................................. 4-348376

[51] Int. Cl.[6] .................................................. G06K 7/08
[52] U.S. Cl. .............................. 235/449; 902/28; 283/82
[58] Field of Search .................................. 235/440, 449, 235/380; 283/82; 360/125; 902/28, 27

[56] References Cited

U.S. PATENT DOCUMENTS

| | | |
|---|---|---|
| 4,114,032 | 9/1978 | Brosow et al. . |
| 4,120,011 | 10/1978 | Kolb, Jr. .................................. 360/125 |
| 4,218,674 | 8/1980 | Brosow et al. . |
| 4,450,348 | 5/1984 | Stockburger et al. . |
| 4,806,740 | 2/1989 | Gold et al. ............................... 235/449 |
| 4,806,740 | 2/1989 | Gold et al. ............................... 283/82 |
| 4,820,912 | 4/1989 | Samyn . |

*Primary Examiner*—Donald Hajec
*Assistant Examiner*—Jeffrey R. Filipek
*Attorney, Agent, or Firm*—Frishauf, Holtz, Goodman, Langer & Chick

[57] ABSTRACT

A number of high-permeability magnetic elements are dispersed in a scanning region of a checking object. A core of a processing apparatus is provided with an exciting coil and a sensor coil. When a bias magnetic field is applied to the core, and the scanning region is passed in the vicinity of a gap, the permeability of the gap varies depending on the density of the magnetic elements, so that a magnetic flux passing through the core changes. A detection signal corresponding to the change of the magnetic flux is detected by means of the sensor coil. This detection signal is converted into a cipher code and then recorded in a code indicator section of the checking object. In checking the authenticity of the object, a detection signal obtained by scanning the scanning region by means of the processing apparatus and a code for collation obtained by decoding the cipher code recorded in the code indicator section are compared, and it is concluded that the checking object is real when the detection signal and the collation code correspond to each other.

7 Claims, 4 Drawing Sheets

METHOD AND AN APPARATUS FOR CHECKING OBJECTS TO BE CHECKED FOR AUTHENTICITY

CROSS-REFERENCE TO THE RELATED APPLICATION

This application is a continuation-in-part of U.S. patent application Ser. No. 08/096,692 filed on Jul. 23, 1993, now abandoned.

BACKGROUND OF THE INVENTION

1. Field of the Invention

The present invention relates to a method and an apparatus for checking important documents, securities, paper money, cards, art objects, and other checking objects which should be checked for authenticity.

2. Description of the Related Art

A checking method and apparatus utilizing microwaves are conventionally known as measures for checking the authenticity of documents and the like, as described in U.S. Pat. No. 4,820,912. According to this prior art, microwaves are applied to a number of particles which are distributed at random in each document, and a proper digital mark responsive to a response microwave bundle are recorded in a suitable region of the document according to specific rules. In checking the authenticity of the document, microwaves are applied to the document, and the response microwave bundle is collated with the digital mark. The document is judged to be real when the microwave bundle and the mark agree with each other.

According to the prior art checking means based on the microwaves, however, measuring the response microwave bundle is susceptible to external noises, so that a satisfactory signal-to-noise ratio cannot be enjoyed. Used to oscillate the microwaves, moreover, the aforesaid prior art apparatus may possibly constitute a source of noises. Generally, furthermore, a microwave transmitter and receiver are large-sized, and entail high costs.

SUMMARY OF THE INVENTION

Accordingly, the object of the present invention is to provide an arrangement such that the authenticity of checking objects can be checked without producing a source of noises, by means of a low-cost compact apparatus with a high signal-to-noise ratio.

A first checking method according to the present invention, developed in order to achieve the above object, is a method for checking the authenticity of a checking object which includes a base formed of a non-magnetic material and a number of high-permeability magnetic elements dispersed in a scanning region of the base, comprising: a manufacturing process for manufacturing the checking object; and a collating process for checking the checking object, the manufacturing process including an excitation step of applying a bias magnetic field and moving the scanning region relatively to the magnetic field, a step of picking up a change on standing of a magnetic flux, which varies depending on the distribution of the magnetic elements, thereby detecting a detection signal for the change of the magnetic flux, as the scanning region passes through the magnetic field, a step of obtaining a cipher code by enciphering the detection signal, and a step of recording the cipher code in a code indicator section of the checking object, and the collating process including the excitation step, the detection step, a step of reading the cipher code recorded in the code indicator section, a step of reproducing a code for collation by decoding the cipher code, and a step of collating the collation code reproduced in the code reproduction step with the detection signal detected in the detection step and concluding that the checking object is real when the collation code and the detection signal correspond to each other.

According to this checking method, the magnetic flux varies with the change of the permeability, which depends on the distribution of the magnetic elements, as the scanning region passes through the bias magnetic field. A detection signal for this change of the magnetic flux is utilized for the check of the checking object. This detection signal varies for each minute portion of the scanning region, depending on the density, size, or orientation of the magnetic elements dispersed in the scanning region. Thus, a detection signal having an output pattern proper to each scanning region can be obtained.

A first apparatus according to the present invention comprises: exciting means for applying a DC bias magnetic field to the scanning region; a transportation mechanism for moving the scanning region relatively to the magnetic field at a predetermined speed; detecting means for picking up a change on standing of a magnetic flux, which varies depending on the distribution of the magnetic elements, thereby detecting a detection signal for the change of the magnetic flux, as the scanning region passes through the bias magnetic field; code writing means for recording a code corresponding to the detection signal in the code indicator section of the checking object; reading means for reading the code recorded in the code indicator section; and means for collating the code read by the reading means with the detection signal detected by the detecting means and concluding that the checking object is real when the read code and the detection signal correspond to each other.

The exciting means may be formed of a permanent magnet or arranged so that the bias magnetic field is obtained by causing a DC current to flow through an exciting coil on a core. A high-permeability alloy material is a suitable material for the core.

A second checking method according to the present invention comprises: a manufacturing process for manufacturing the checking object; and a collating process for checking the checking object, the manufacturing process including an excitation step of applying a magnetic field to the magnetic elements within the scanning region by means of a magnetic field generator while passing the scanning region between the magnetic field generator and a magnetic sensor, a step of detecting a detection signal for a change on standing of the magnetic shielding effect, which varies depending on the distribution of the magnetic elements, by means of the magnetic sensor, as the scanning region crosses the magnetic field, a step of obtaining a cipher code by enciphering the detection signal, and a step of recording the cipher code in a code indicator section of the checking object, and the collating process including the excitation step, the detection step, a step of reading the cipher code recorded in the code indicator section, a step of reproducing a code for collation by decoding the cipher code, and a step of collating the collation code reproduced in the code reproduction step with the detection signal detected in the detection step and concluding that the checking object is real when the collation code and the detection signal correspond to each other.

A second apparatus according to the present invention comprises: a first exciting coil for applying a first alternating field to the scanning region; a first magnetic sensor opposed to the first exciting coil; a transportation mechanism for passing the scanning region between the first exciting coil and the first magnetic sensor; a second exciting coil situated in a position magnetically isolated from the first exciting coil and used to generate a second alternating field identical with the first alternating field; a second magnetic sensor opposed to the second exciting coil; a circuit for fetching a detection signal corresponding to the difference between an output produced in the first magnetic sensor and an output produced in the second magnetic sensor as the scanning region passes between the first exciting coil and the first magnetic sensor; code writing means for recording a code corresponding to the detection signal in the code indicator section of the checking object; reading means for reading the code recorded in the code indicator section; and means for collating the code read by the reading means with the detection signal and concluding that the checking object is real when the read code and the detection signal correspond to each other.

The magnetic elements according to the present invention may suitably be made by a wire member formed of a high-permeability alloy material (such as Co-Fe-Si-B-based amorphous alloy, Fe-Ni alloy, or permalloy), a leaf (flake), powder of the same alloy, or a combination of these. In the description herein, a high permeability is one which provides the maximum specific permeability ($\mu$) of 10,000 or more. In the case where the magnetic element is formed of the wire member or leaf, a large number of such magnetic elements are randomly mixed in the scanning region of the checking object. In the case where the magnetic elements is formed of powder, it is dispersed as a random pattern of varying density, as a random pattern of uniform density, or a combination of these, in the scanning region of the checking object.

According to the present invention, the scanning region is scanned magnetically, so that the apparatus can enjoy a smaller size and lower costs than the checking means which uses microwaves. Since the magnetic elements can be detected even in a scanty magnetic field, the apparatus can avoid producing noises. Also, the signal-to-noise ratio is high, and the reproducibility is satisfactory.

The present invention is applicable to authenticity check of papers, such as securities, paper money, important documents, etc., or plastic cards, such as ID cards, CD cards, credit cards, etc., prevention of forgery of art objects, or discrimination of the real from the false.

DETAILED DESCRIPTION OF THE PREFERRED EMBODIMENTS

Referring now to FIGS. 1 to 5, a first embodiment of the present invention will be described.

Figure 1:
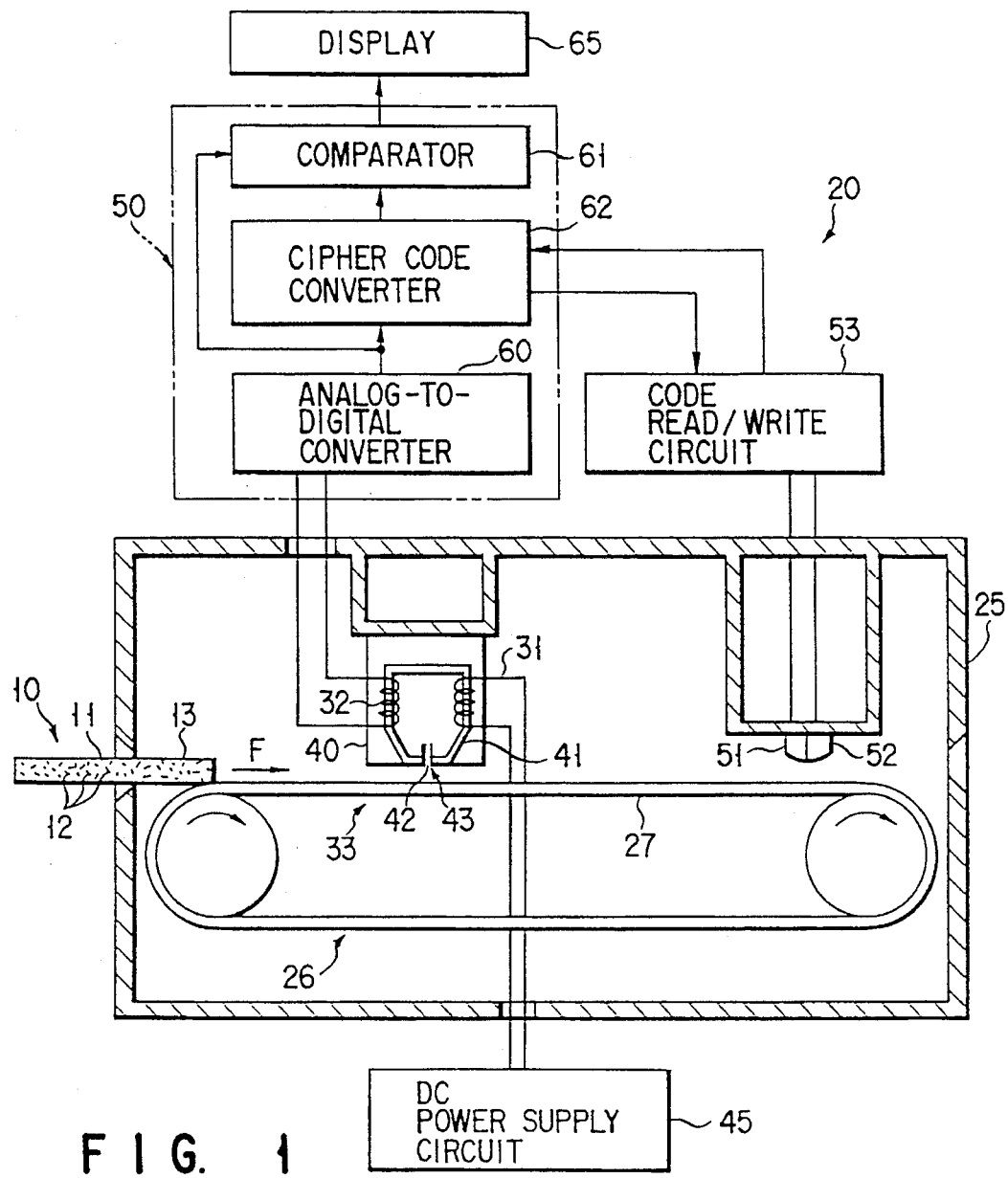
FIG. 1 is a side view, partially in section, showing an outline of a processing apparatus according to an embodiment of the present invention.
Figure 2:
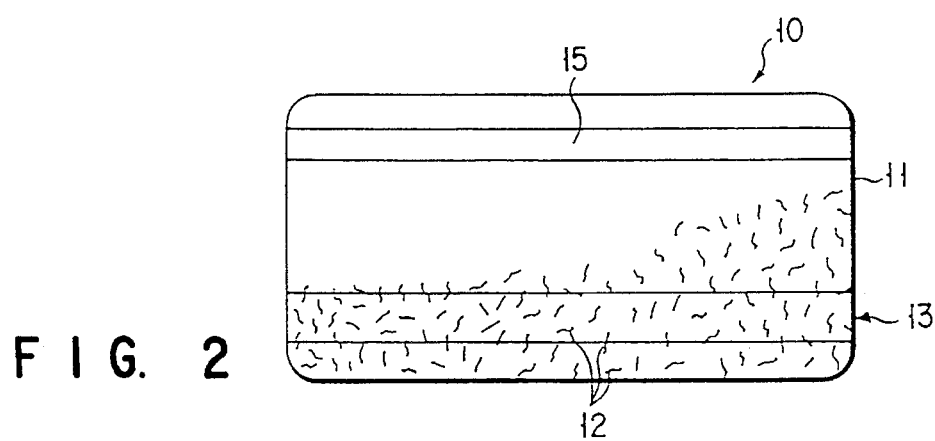
FIG. 2 is a plan view showing an example of a checking object.

As shown in FIG. 2, a number of high-permeability magnetic elements 12 are dispersed at random in a base 11 of a checking object 10 so as to be oriented in many and unspecified directions. The base 11 is formed of a nonmagnetic material such as paper, plastics, etc. Each magnetic element 12 may, for example, be in the form of a wire of high-permeability alloy material having a diameter of about 7 to 50 μm and length of about 5 to 30 mm. Alternatively, the element 12 may be formed of a leaf of a high-permeability alloy material having a thickness of about 7 to 50 μm and length of about 5 to 30 mm or powder of a high-permeability alloy material having a diameter of the order of 0.1 μm to 10 μm. These elements 12 are dispersed into a specific scanning region 13 so as to enjoy a certain measure of density when the checking object 10 is manufactured.

In the case where the magnetic material is formed of a wire member or leaf, a large number of such magnetic elements 12 are randomly mixed in the scanning region 13 of the checking object. In the case where the magnetic element 12 is formed of powder, it is dispersed as a random pattern of varying density, or a random pattern of uniform density, or a combination of these, in the scanning region 13 of the checking object 10.

The checking object 10 is provided with the scanning region 13 and a code indicator section 15. Informations corresponding to the magnetic elements 12 within the scanning region 13 are enciphered and written in the indicator section 15. The checking object 10 is magnetically scanned by means of a processing apparatus 20 shown in FIG. 1. The processing apparatus 20 comprises a housing 25 and a transportation mechanism 26. The mechanism 26 is arranged so that the object 10 is moved at constant speed in the direction of arrow F of FIG. 1 by means of a transportation member 27, formed of a belt, rollers, etc.

A coil pair 33 for induction voltage detection, formed of an exciting coil 31 and a sensor coil 32, is provided in the middle of the path of movement of the checking object 10. The coils 31 and 32 are arranged on a core 41 of a sensor head 40. The core 41, which is formed of a high-permeability alloy material, has a gap 42, and constitutes a closed magnetic circuit. The length of the gap 42 ranges from about 30 to 100 μm.

A sensing section 43 is located in the vicinity of gap 42 so that the scanning region 13 passes through the section 43. The exciting coil 31 is connected with a DC power supply circuit 45 for applying a DC bias magnetic field to the core 41. As an electric current is caused to flow through the coil 31, fixed quantities of magnetic fluxes pass through the core 41, and part of the bias magnetic field passes through the sensing section 43.

Possibly, one coil may be used to fulfill the functions of both the exciting coil 31 and the sensor coil 32. In this case, the reduced coil number permits a reduction in cost. Although the coil 32 is used as an example of a magnetic sensor according to the embodiment described above, a magnetic sensing element, such as a Hall element, may be used in place of the coil 32.

The processing apparatus 20 further comprises a controller 50 formed of a microcomputer or the like, a code writing unit 51 for recording the following cipher code in the code indicator section 15 of the checking object 10, a code reading unit 52 for reading the cipher code recorded in the indicator section 15, etc. The units 51 and 52 are connected to a code read/write circuit 53. The controller 50 includes an analog-to-digital converter 60, a comparator 61, a cipher code converter 62, etc. A display 65 is connected to the controller 50.

The following is a description of the operation of the apparatus 20 according to the above-described embodiment.

Figure 4:
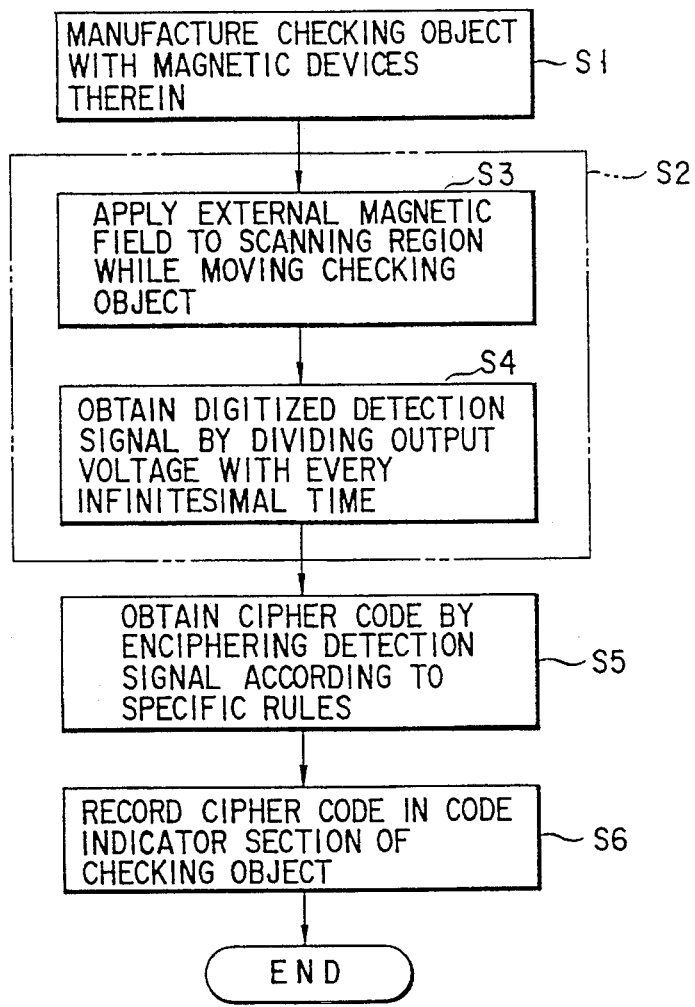
FIG. 4 is a flow chart showing a process for manufacturing the checking object.

FIG. 4 shows an outline of a process for manufacturing the checking object 10. In Step S1, the magnetic elements 12 are dispersed into the base 11 of the object 10 as the base 11 is manufactured. In Step S2 for scanning, the object 10 is moved in the direction of arrow F at a predetermined speed by means of the transportation mechanism 26. Step S2 includes Step S3 for excitation and Step S4 for detection.

In Step S3, a DC current is caused to flow through the exciting coil 31 by means of the DC power supply circuit 45, thereby applying the DC bias magnetic field to the core 41 in advance. If none of the magnetic elements 12 exist in the sensing section 43 of the core 41, the permeability of the gap 42 remains in its initial state, so that the magnetic fluxes passing through the core 41 are uniform. Accordingly, no electromagnetic induction voltage can be produced in the coil 32, so that the voltage delivered to the controller 50 is substantially zero.

When the scanning region 13 is passed through the sensing section 43 by moving the checking object 10 in the direction of arrow F at the predetermined speed by means of the transportation mechanism 26, a plurality of minute portions of the scanning region 13 successively pass through the sensing section 43. At this time, the permeability of the gap 42 changes with the passage of time, depending on the conditions of the magnetic elements 12, so that the number of the magnetic fluxes passing through the core 41 varies. As a result, an electromagnetic induction voltage is produced in the sensor coil 32.

Figure 3:
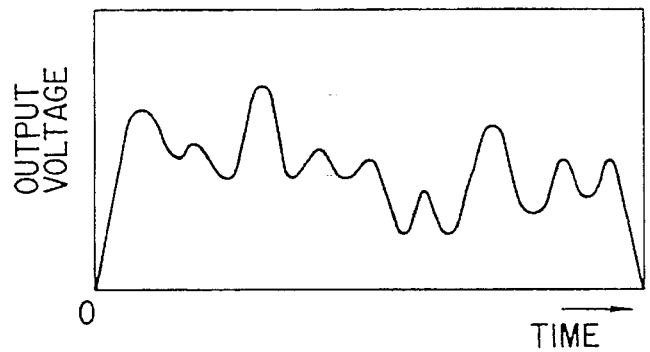
FIG. 3 is a diagram showing an output voltage produced as the checking object is scanned.

Since this induction voltage changes its level depending on the density, diameter (or thickness), length, direction, etc. of the magnetic elements 12, it is measured as an output voltage pattern, as illustrated in FIG. 3. In this embodiment, the scanning region 13 is divided with every infinitesimal time for detection, and output voltages for the individual infinitesimal times are ranked in a plurality of stages and digitized, in Step S4. Thus, an encoded detection signal proper to the scanning region 13 can be obtained.

This detection signal is enciphered according to specific rules by means of the cipher code converter 62 in Step S5 for encipherment. The resulting cipher code is recorded in the code indicator section 15 by means of a magnetic head of the code writing unit 51 in Step S6 for writing. Although the indicator section 15 of this embodiment is a magnetic stripe, the cipher code may be recorded in the form of a bar code in the indicator section 15 by means of, for example, a print head.

Figure 5:
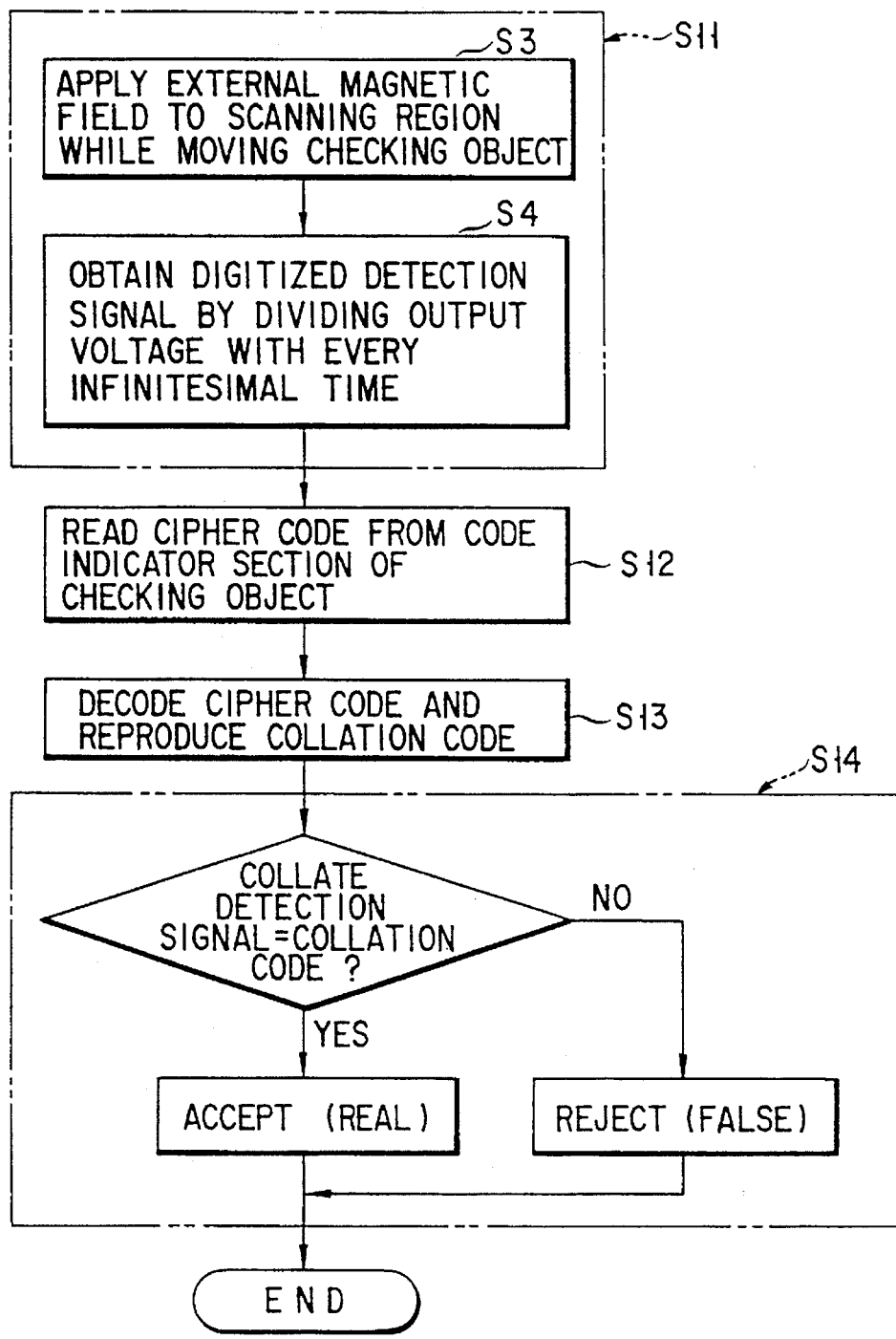
FIG. 5 is a flow chart showing a collating process for checking the authenticity of the checking object.

The authenticity of the checking object 10 can be also checked by using the processing apparatus 20. FIG. 5 shows an outline of a collating process for checking the authenticity of the object 10. Step S11 for scanning includes Step S3 for excitation and Step S4 for detection, which are identical with those of the aforementioned process for manufacturing the checking object 10. A detection signal corresponding to the distribution of the magnetic elements 12 is obtained by scanning the scanning region 13 at a predetermined speed.

In Step S12 for code reading, the cipher code recorded in the code indicator section 15 is read by means of the code reading unit 52. As this code is decoded according to specific rules by means of the cipher code converter 62 in Step S13 for code reproduction, a code for collation is reproduced. In Step S14 for discrimination, the collation code and the detection signal detected in Step S4 for detection are compared by means of the comparator 61, and it is concluded that the checking object 10 is real only when the code and the signal agree with each other. The result of the collation is indicated on the display 65.

According to the processing apparatus 20, the scanning region 13 can be detected even if the external magnetic fields applied to the checking object 10 are weak. Even though the cipher code and other informations are magnetically recorded in the code indicator section 15 or other areas, therefore, these magnetic informations can never be destroyed. Since an induction voltage detection signal is obtained by means of the core 41, having the gap 42, and the coil 32, moreover, it is not susceptible to external noises.

Figure 6:
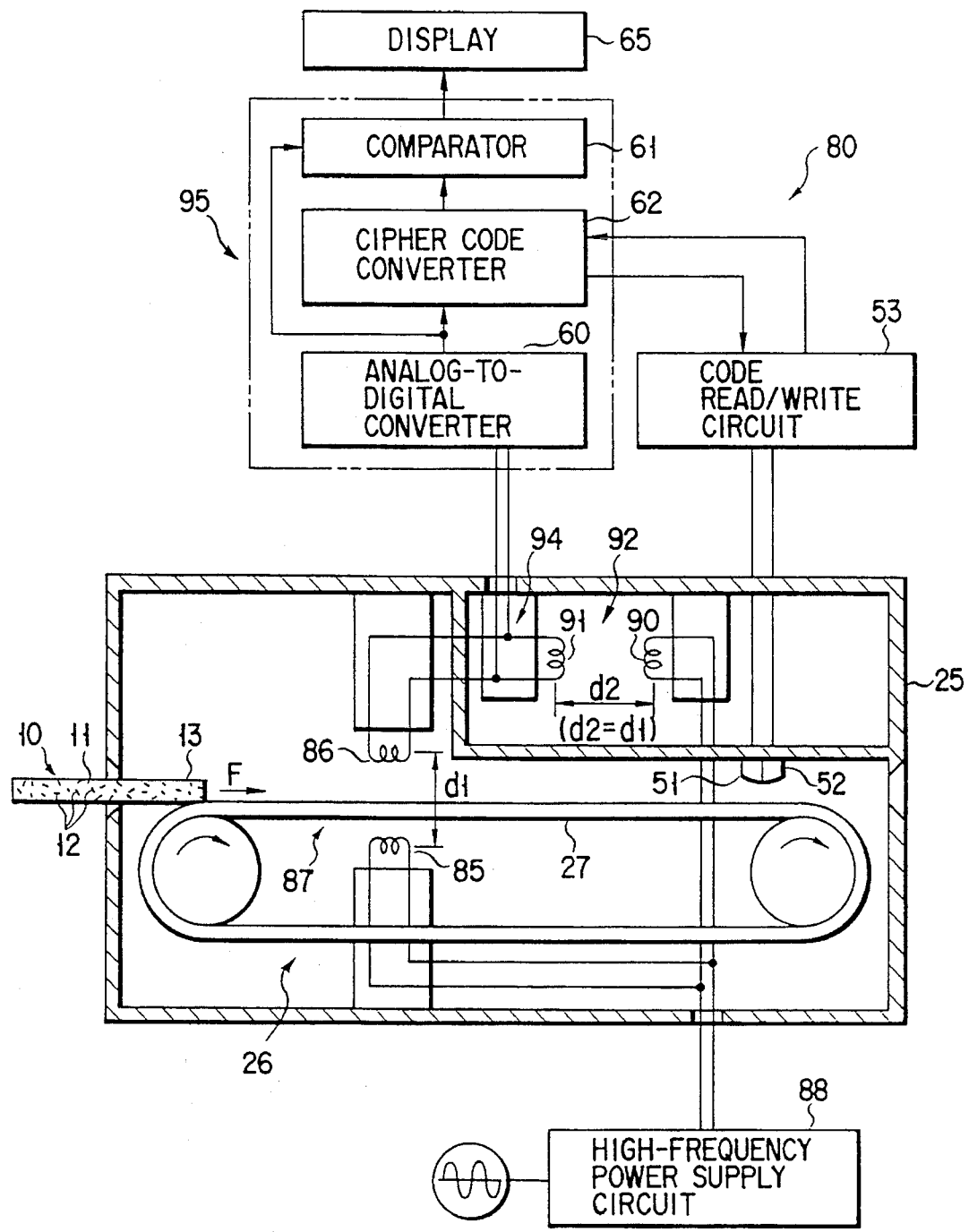
FIG. 6 is a side view, partially in section, showing a processing apparatus according to another embodiment of the invention.

Referring now to FIG. 6, a second embodiment of the present invention will be described. A processing apparatus 80 shown in FIG. 6 is designed so that a first exciting coil 85, for use as a magnetic field generator, and a first sensor coil 86, for use as a magnetic field sensor, are arranged in the middle of a path along which the checking object 10 moves. These coils 85 and 86, which constitute a coil pair 87 for permeability detection, are arranged at a distance d1 from each other. The scanning region 13 of the checking object 10 is passed between the coils 85 and 86 by means of the transportation mechanism 26. The exciting coil 85, which is connected to a high-frequency power supply circuit 88, serves to apply an alternating field to the magnetic elements 12 within the scanning region 13.

Further, a coil pair 92 for comparison, which is formed of a second exciting coil 90 and a second sensor coil 91, is located in a position magnetically isolated from the first exciting coil 85. A distance d2 between the second exciting coil 90 and the second sensor coil 91 is equal to the distance d1 between the first coils 85 and 86.

The first and second exciting coils 85 and 90 have the same electromagnetic properties (inductance, resistance, coil wire diameter, number of coil turns, etc.). Likewise, the first and second sensor coils 86 and 91 have the same electromagnetic properties. Further, the first and second exciting coils 85 and 90, which are in the same phase, are connected to the high-frequency power supply circuit 88. The first and second sensor coils 86 and 91, which are in opposite phases, are connected to a controller 95 through a differential voltage fetch circuit 94.

The processing apparatus 80 comprises the controller 95 formed of a microcomputer or the like, as well as the same code writing unit 51, code reading unit 52, code read/write circuit 53, etc. as are used in the foregoing embodiment. The coils 86 and 91 may be replaced with magnetic sensing elements, such as Hall element, which utilize the galvanomagnetic effect.

In manufacturing the checking object 10, the magnetic elements 12 are dispersed into the base 11, as in Step S1 of the manufacturing process of FIG. 4 described in connection with the foregoing embodiment. Then, in Step S2 for scanning, the object 10 is moved in the direction of arrow F at a predetermined speed by means of the transportation mechanism 26, whereby the scanning region 13 is scanned. In this processing apparatus 80, an alternating current of a high frequency (e.g., 500 to 1.000 Hz) is applied to the first and second exciting coils 85 and 90 by means of the high-frequency power supply circuit 88. In this case, equal alternating fields are generated in the coils 85 and 90 which are connected in the same phase, so that equal electromagnetic induction voltages are produced in the sensor coils 86 and 91 before the scanning region 13 is scanned.

If it is concluded in Step S3 that the checking object 10 is not situated between the first exciting coil 85 and the first sensor coil 86, the voltages produced in the first and second sensor coils 86 and 91, which are in the opposite phases, are equal, so that the voltage delivered to the controller 50 remains zero. When the scanning region 13 passes between the first exciting coil 85 and the first sensor coil 86, the voltage produced in the coil 86 is lowered by the magnetic shielding effect of the magnetic elements 12. Since the magnetic elements 12 are not situated between the second exciting coil 90 and the second sensor coil 91, on the other hand, the output of the coil 91 makes no change. Accordingly, a voltage corresponding to the difference between the voltages produced in the first and second sensor coils 86 and 91 is delivered to the analog-to-digital converter 60.

The higher the density of the magnetic elements 12, the greater the aforesaid magnetic shielding effect is. Thus, the higher the density of the elements 12, the higher or greater the aforesaid output voltage or the output difference between the first and second sensor coils 86 and 91 is. When Step S3 for excitation is executed while moving the checking object 10 in the direction of arrow F at the predetermined speed by means of the transportation mechanism 26, therefore, the minute portions of the scanning region 13 successively pass between the first exciting coil 85 and the first sensor coil 86, so that the change of density of the magnetic elements 12 is detected in the form of an output voltage pattern. In Step S4, this output voltage is detected with every infinitesimal time, and the output voltage for the individual infinitesimal times are ranked in a plurality of stages and converted into digital values. Thus, an encoded detection signal proper to the scanning region 13 can be obtained.

This detection signal is converted into a cipher code by means of the cipher code converter 62 in Step S5 for encipherment. The cipher code is recorded in the code indicator section 15 by means of the magnetic head of the code writing unit 51 in Step S6 for writing.

The authenticity of the checking object 10 can be also checked by using the processing apparatus 80. In Step S11 for scanning which includes Step S3 for excitation and Step S4 for detection, as in the collating process shown in FIG. 5, the detection signal for the scanning region 13 corresponding to the distribution of the magnetic elements 12 is obtained by scanning the region 13.

In Step S12 for code reading, the cipher code recorded in the code indicator section 15 is read by means of the code reading unit 52. As this code is decoded according to the specific rules by means of the cipher code converter 62 in Step S13 for code reproduction, the code for collation is reproduced. In Step S14 for discrimination, the collation code and the detection signal detected in Step S4 for detection are compared by means of the comparator 61, and it is concluded that the checking object 10 is real when the code and the signal agree with each other.

According to the present invention, moreover, the magnetic elements 12 may be embedded in the back of the canvas of a picture, for example. In this case, a cipher code, similar to the ones according to the foregoing embodiments, is recorded in a code indicator section, whereby the picture can be proved to be authentic. If the magnetic elements 12 according to the invention are embedded in art objects in three dimensions, furthermore, the original objects can be distinguished from imitations.

What is claimed is:

1. A method for checking the authenticity of a checking object which includes a base formed of a non-magnetic material and a number of high-permeability magnetic elements dispersed in a scanning region of the base, comprising the steps of:

a manufacturing process for manufacturing the checking object; and a collating process for checking the checking object, the manufacturing process including the following steps:

an excitation step of applying a bias magnetic field to said high-permeability magnetic elements dispersed in said scanning region and simultaneously moving the scanning region relatively to the magnetic field, said bias magnetic field having a magnitude such that said high-permeability magnetic elements are restored from a magnetized state back to an original state when application of the bias magnetic field is stopped, a picking-up step of picking up a change in standing of a magnetic flux, which varies depending on the distribution of said high-permeability magnetic elements, thereby detecting a detection signal for the change of the magnetic flux, as the scanning region passes through the magnetic field, said excitation step and said picking-up step being executed simultaneously, a step of obtaining a cipher code by enciphering the detection signal, and a step of recording the cipher code in a code indicator section of the checking object, and the collating process including the following steps:

an excitation step of applying the bias magnetic field to said high-permeability magnetic elements dispersed in said scanning region and simultaneously moving the scanning region relatively to the magnetic field, a picking-up step of picking up the change in standing of the magnetic flux, which varies depending on the distribution of said high-permeability magnetic elements, thereby detecting the detection signal for the change of the magnetic flux, as the scanning region passes through the magnetic field, said excitation step and said picking-up step being executed simultaneously, a step of reading the cipher code recorded in the code indicator section, a step of reproducing a code for collation by decoding the cipher code, and a step of collating the collation code reproduced in the code reproduction step with the detection signal detected in the detection step and concluding that the checking object is real when the collation code and the detection signal correspond to each other.

2. A checking method according to claim 1, wherein said excitation step includes the step of applying the bias magnetic field to a core having a gap by means of an exciting coil and a DC power supply circuit, and said picking-up step includes the step of detecting the detection signal for the change of the magnetic flux, which is caused as the permeability of the gap varies depending on the distribution of the magnetic elements, by means of a coil for induction voltage detection.

3. An apparatus for checking the authenticity of a checking object which includes a base formed of a non-magnetic material, a scanning region provided in the base, a code indicator section provided in the base, and a number of high-permeability magnetic elements dispersed in the scanning region, the apparatus comprising:

exciting means for applying a DC bias magnetic field to said high-permeability magnetic elements dispersed in said scanning region;

said bias magnetic field having a magnitude such that said high-permeability magnetic elements are restored from a magnetized state back to an original state when application of the bias magnetic field is stopped, a transportation mechanism for moving the scanning region relatively to the magnetic field at a predetermined speed;

detecting means for picking up a change in standing of a magnetic flux, which varies depending on the distribution of said high-permeability magnetic elements, thereby detecting a detection signal for the change of the magnetic flux, as the scanning region passes through the bias magnetic field;

code writing means for recording a code corresponding to the detection signal in the code indicator section of the checking object;

reading means for reading the code recorded in the code indicator section; and means for collating the code read by the reading means with the detection signal detected by the detecting means and concluding that the checking object is real when the read code and the detection signal correspond to each other.

4. An apparatus according to claim 3, wherein said exciting means includes a core having a gap, an exciting coil on the core, and a DC power supply circuit connected to the coil, and said detecting means is a coil for induction voltage detection on the core.

5. A method for checking the authenticity of a checking object which includes a base formed of a non-magnetic material and a number of high-permeability magnetic elements dispersed in a scanning region of the base, comprising the steps of:

a manufacturing process for manufacturing the checking object; and a collating process for checking the checking object, the manufacturing process including the following steps:
an excitation step of applying a magnetic field to said high-permeability magnetic elements dispersed within the scanning region by means of a magnetic field generator while simultaneously passing the scanning region between the magnetic field generator and a magnetic sensor, said magnetic field having a magnitude such that said high-permeability magnetic elements are restored from a magnetized state back to an original state when application of the magnetic field is stopped, a step of detecting a detection signal for a change in standing of a magnetic shielding effect, which varies depending on the distribution of the high-permeability magnetic elements, by means of the magnetic sensor, as the scanning region crosses the magnetic field, said excitation step and said step of detecting being executed simultaneously, a step of obtaining a cipher code by enciphering the detection signal, and a step of recording the cipher code in a code indicator section of the checking object, and the collating process including the following steps:
an excitation step of applying the magnetic field to said high-permeability magnetic elements within the scanning region by means of the magnetic field generator while simultaneously passing the scanning region between the magnetic field generator and the magnetic sensor, a step of detecting the detection signal for the change in standing of a magnetic shielding effect, which varies depending on the distribution of said high-permeability magnetic elements, by means of the magnetic sensor, as the scanning region crosses the magnetic field, said excitation step and said step of detecting being executed simultaneously, a step of reading the cipher code recorded in the code indicator section, a step of reproducing a code for collation by decoding the cipher code, and a step of collating the collation code reproduced in the code reproduction step with the detection signal detected in the detection step and concluding that the checking object is real when the collation code and the detection signal correspond to each other.

6. An apparatus for checking the authenticity of a checking object which includes a base formed of a non-magnetic material, a scanning region provided in the base, a code indicator section provided in the base, and a number of high-permeability magnetic elements dispersed in the scanning region, the apparatus comprising:

a first exciting coil for applying a first alternating field to said high-permeability magnetic elements dispersed in said scanning region, said first alternating field having a magnitude such that said high-permeability magnetic elements are restored from a magnetized state back to an original state when application of said first state alternating magnetic field is stopped, a first magnetic sensor opposed to the first exciting coil;

a transportation mechanism for passing the scanning region between the first exciting coil and the first magnetic sensor;

a second exciting coil situated in a position magnetically isolated from the first exciting coil and used to generate a second alternating field identical with the first alternating field;

a second magnetic sensor opposed to the second exciting coil;

a circuit for fetching a detection signal corresponding to the difference between an output produced in the first magnetic sensor and an output produced in the second magnetic sensor as the scanning region passes between the first exciting coil and the first magnetic sensor;

code writing means for recording a code corresponding to the detection signal in the code indicator section of the checking object;

reading means for reading the code recorded in the code indicator section; and means for collating the code read by the reading means with the detection signal and concluding that the checking object is real when the read code and the detection signal correspond to each other.

7. An apparatus according to claim 6, wherein a distance d1 from the first exciting coil to the first magnetic sensor and a distance d2 from the second exciting coil to the second magnetic sensor are equal, said first and second exciting coils have the same electromagnetic properties, said first and second magnetic sensors have the same electromagnetic properties, and said magnetic sensors are connected to each other by means of the circuit.

* * * * *

UNITED STATES PATENT AND TRADEMARK OFFICE
CERTIFICATE OF CORRECTION

PATENT NO. : 5,473,147
DATED : December 5, 1995
INVENTOR(S) : HOSHINO et al.

It is certified that error appears in the above-indentified patent and that said Letters Patent is hereby corrected as shown below:

Title page:

Item [*] Notice, line 2,

"Sep. 19, 2012" should be --June 21, 2014--

Item [56] References Cited, under "U.S. PATENT DOCUMENTS"

delete (second occurrence of)
"4,806,740  2/1989 Gold et al. ... 283/82"

Signed and Sealed this

Fourth Day of June, 1996

Attest:

BRUCE LEHMAN

*Attesting Officer*       *Commissioner of Patents and Trademarks*